United States Patent
Sasaki et al.

(10) Patent No.: US 10,976,439 B2
(45) Date of Patent: Apr. 13, 2021

(54) NAVIGATION SYSTEM AND NAVIGATION METHOD

(71) Applicant: SUBARU CORPORATION, Tokyo (JP)

(72) Inventors: Yutaka Sasaki, Tokyo (JP); Akitoshi Sakaguchi, Tokyo (JP); Akihiro Yamane, Tokyo (JP); Toshiyuki Narahashi, Tokyo (JP); Yoichi Onomura, Tokyo (JP); Kumiko Kindaichi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 181 days.

(21) Appl. No.: 16/186,190

(22) Filed: Nov. 9, 2018

(65) Prior Publication Data

US 2019/0154838 A1    May 23, 2019

(30) Foreign Application Priority Data

Nov. 21, 2017    (JP) ............................... JP2017-224072

(51) Int. Cl.
 G01S 19/11    (2010.01)
 G01S 5/30     (2006.01)
 G01S 1/04     (2006.01)

(52) U.S. Cl.
 CPC ............. G01S 19/11 (2013.01); G01S 1/042 (2013.01); G01S 1/0423 (2019.08); G01S 5/30 (2013.01)

(58) Field of Classification Search
 CPC .......... G01S 19/10; G01S 19/11; G01S 1/042; G01S 1/0423; G01S 5/183; G01S 5/30; G01S 5/0252–5/02529; G01S 19/41
 See application file for complete search history.

(56) References Cited

U.S. PATENT DOCUMENTS

| | | | | |
|---|---|---|---|---|
| 7,379,388 | B2* | 5/2008 | Protoolis | G01S 5/18 367/118 |
| 9,026,138 | B2* | 5/2015 | Do | H04W 24/00 455/456.1 |
| 2018/0120442 | A1* | 5/2018 | Powe | G01S 5/30 |

OTHER PUBLICATIONS

Atsushi Kezuka, et al., "Trends in Alternative Systems in the Case of GNSS Failure", Electronic Navigation Research Institute, Electronic Navigation Research Institute, Jun. 6, 2014, searched on Oct. 30, 2017 through internet <URL:http://www.enri.go.jp/report/hapichi/pdf2014/H26_21p.pdf>.

(Continued)

*Primary Examiner* — Cassi J Galt
(74) *Attorney, Agent, or Firm* — Troutman Pepper Hamilton Sanders LLP (57) ABSTRACT

There is provided a navigation system, comprising: a buoy on a water surface movably anchored to a bottom; a plurality of at least three transmitters fixed to the bottom or at different positions in the water for transmitting signals to specify the positions; a receiver, being disposed with the buoy, configured to receive signals transmitted by the plurality of transmitters; a signal processor, being disposed with the buoy, configured to specify the position of the buoy, based on the signals received by the receiver, and generate a navigation signal indicating the position of the buoy, and a radio, being disposed with the buoy, configured to transmit the navigation signal generated in the signal processor wirelessly, the navigation signal being receivable by a radio in a mobile body.

16 Claims, 4 Drawing Sheets

(56) References Cited

OTHER PUBLICATIONS

Jun Kitaori, et al., "Research on Future Aircraft High-Speed Data Links", Electronic Navigation Laboratory Report, Jan. 2015, No. 132, p. 51-60, searched on Oct. 30, 2017 through internet <URL:https://www.enri.go.jp/report/gijutu/pdf/132_4.pdf>.

LDACS-NAV, DLR, searched on Oct. 30, 2017 through internet <URL:http://www.dlr.de/kn/en/desktopdefault.aspx/tabid-4309/3222_read-35386/admin-1/->.

* cited by examiner

NAVIGATION SYSTEM AND NAVIGATION METHOD

CROSS-REFERENCE TO RELATED APPLICATIONS

The present application claims priority from Japanese Patent Application No. 2017-224072 filed on Nov. 21, 2017, the entire contents of which are hereby incorporated by reference.

BACKGROUND

1. Technical Field

Examples of the present invention relate to navigation systems and navigation methods.

2. Related Art

A navigation system using the Global Positioning System (i.e., GPS) operated by the United States of America has been known as a famous system for guiding a mobile body such as an aircraft to a destination. A GPS-based navigation system is a system for detecting the spatial position of a mobile body on which a GPS receiver is mounted by receiving radio waves from a plurality of GPS satellites with the GPS receiver. The official name of GPS satellites is NAVSTAR (i.e., Navigation Satellite with Time and Ranging).

Since GPS satellites fly at an altitude of about 20,000 km, the strength of GPS signals is weak compared to the strength of radio signals for other data links. Therefore, GPS signal may be difficult to receive when a radio disturbance occurs in the ionosphere due to solar flare or an interfering radio wave being transmitted as well as malfunction of the GPS satellite. Radio jamming due to deceiving signals disguised as GPS signals has also been reported.

Global Navigation Satellite Systems (i.e., GNSS) using artificial satellites, such as GPS, includes other systems such as Russian GLONASS (i.e., Global'naya Navigatsionnnaya Sputnikovaya Sistema) and the Galileo planned by the European Union. More overly, a navigation satellite system (i.e., NSS) that covers a particular region are referred to as RNSS (i.e., Regional Navigation Satellite Systems).

Currently, many mobile navigation systems, such as aircrafts, rely on GPS. Therefore, development of a navigation system that does not rely on GPS has been considered as disclosed in Non-Patent Literature 1 listed below.

[Non-Patent Literature 1]

Atsushi Kezuka, et al., "Trends in Alternative Systems in the Case of GNSS Failure", Electronic Navigation Research Institute, Electronic Navigation Research Institute, Jun. 6, 2014, searched on Oct. 30, 2017 through internet.

As a specific example, the German Aerospace Center (DLR: Deutsches Zentrum fuer Luft- and Raumfahrt) has proposed a navigation system called LDACS-NAV using L-band Digital Aeronautical Communications System (LDACS) as disclosed in Non-Patent Literatures 2 and 3 listed below.

[Non-Patent Literature 2]

Jun Kitaori, et al., "A Study on Future Aeronautical High-Speed Transmission Datalinks", Electronic Navigation Laboratory Report, January 2015, No. 132, p. 51-60, searched on Oct. 30, 2017 through Internet

[Non-Patent Literature 3]

LDACS-NAV, DLR, searched on Oct. 30, 2017 through internet

LDACS is a high-speed data link system using radio wave signals wirelessly transmitted from a base station installed on the ground, and the LDACS-NAV is a navigational system for receiving navigation signals, being wirelessly transmitted from the base station installed on the ground, by a mobile body such as an airplane, so as to specify the spatial positions including latitude, longitude, and altitude of the mobile body based on the received navigation signals.

In LDACS, radio wave signals in a frequency band different from the frequency band of GPS signals is used. Therefore, LDACS-NAV is expected to be an alternative to GPS-based navigational systems when GPS satellites fail or when solar flares cause radio disturbances in the ionosphere, as well as when GPS deceiving signals are transmitted.

In addition to LDACS-NAV, a navigation system using distance-measuring equipment (DME), a navigation system using Pseudolite (PL), and the like have been proposed.

DME is equipment that performs two-way communication for transmitting radio wave signals in response to requests from aircrafts and is installed on the ground. By measuring the time taken for the radio wave signal transmitted from the DME to reach the aircraft, the distance between the aircraft and the DME installed on the ground may be measured. Therefore, the spatial position of an aircraft may be specified based on radio wave signals transmitted from a plurality of DMEs.

On the other hand, PL is equipment that wirelessly transmits a PL signal similar to a GPS signal as a radio wave signal, and is installed on the ground. Therefore, the spatial position of the aircraft may be specified based on PL signals transmitted from a plurality of PLs.

SUMMARY OF THE INVENTION

An aspect of the present invention provides a navigation system including a buoy on a water surface, at least three transmitters, a receiver, a signal processor, and a radio. The buoy is movably anchored to a bottom. The transmitters are fixed to the bottom or at different positions in the water for transmitting signals to specify the positions. The receiver is disposed with the buoy, and configured to receive signals transmitted by the transmitters. The signal processor is disposed with the buoy, and configured to specify the position of the buoy, based on the signals received by the receiver, and generate a navigation signal indicating the position of the buoy. The radio is disposed with the buoy, and configured to transmit the navigation signal generated in the signal processor wirelessly such that the navigation signal is received by a radio in a mobile body.

An aspect of the present invention provides a navigation method includes: receiving, by a radio disposed with the mobile body, navigation signals originated from different positions, and specifying a position of the mobile body based on the navigation signals received by the radio disposed with the mobile body. The navigation signals are at least three navigation signals including the navigation signals transmitted by the navigation system.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

In anyone of the previously proposed navigation systems, radio wave signals transmitted from satellites or base stations installed on the ground are used. When radio signals transmitted from a base station installed on the ground are used, the navigation system may be used only within a Line of Sight (i.e., LOS) between a transmitter installed in the base station and a receiver installed in a mobile body such as an airplane. Further, accuracy decreases at sea where radio stations cannot be installed.

Therefore, it is desirable to enable use of a navigation system over a wider range, and serve as an alternative to, navigation systems using a GNSS such as GPS or the like.

First Example (Configuration and Function of the Navigation System)

Figure 1:
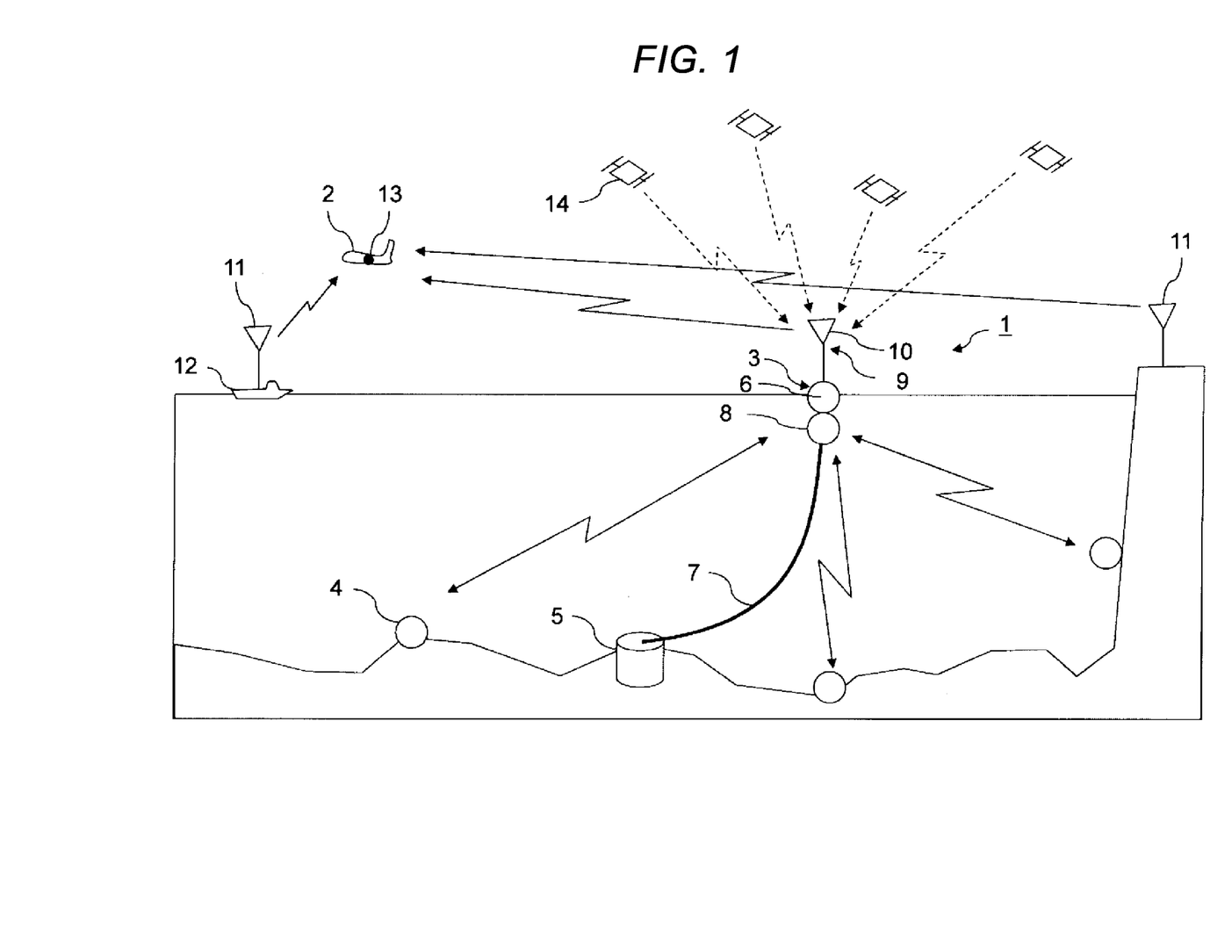
FIG. 1 is an overall configuration diagram of a navigation system according to a first example of the present invention.

FIG. 1 is an overall configuration diagram of a navigation system according to a first example of the present invention.

The navigation system 1 wirelessly transmits a navigation signal from the water surface so as to navigate a mobile body moving on or over the water surface, or moving at the shore, such as an aircraft 2, a rocket, or a ship. Here, a case where the mobile body is an aircraft 2 will be described as an example. Although the navigation system 1 transmits a navigation signal from the sea surface, the navigation signal may be also transmitted from a lake surface or a river surface.

The navigation system 1 may consist of an anchor buoy 3 floating along the surface of the water and at least three or more transponders 4 fixed at the bottom of the water or in the water, with each transponder 4 being at a different position. In the example illustrated in FIG. 1, two of the three transponders 4 are fixed to the seafloor, and one of transponders 4 is fixed to the wall surface where the water meets the land.

The anchor buoy 3 is a buoy 6 that is anchored to the bottom of the water by an anchor 5 so as to be movable along the sea surface. That is, the anchor buoy 3 is configured by connecting a buoy 6 floating along the sea surface and an anchor 5 fixed to the seafloor with a rope 7 such as a wire rope or a nylon rope. Of course, a chain may be used instead of the rope 7.

The buoy 6 is anchored to the seafloor by the anchor 5 with the rope 7 with sufficient slack. The rope 7 is provided with sufficient slack because water pressure is applied to the buoy 6 by water flow in the form of ocean currents, tidal currents, and waves, and if the rope 7 becomes taut by the movement of the buoy 6, the rope 7 may break due to excessive tension. Further, even if the rope 7 is set to be very strong, if the rope 7 becomes taut due to the movement of the buoy 6, the buoy 6 may sink below the water surface. The buoy 6 constituting the typical anchor buoy 3 is movable within a radius of about 500 m.

A transceiver 8 and a navigation signal transmitter 9 are mounted on the buoy 6. The transceiver 8 is a communication apparatus that performs two-way communication with a plurality of transponders 4 fixed on the seafloor or within the sea depth. Thus, the transceiver 8 is disposed below the surface of the water.

The navigation signal transmitter 9 is a radio navigation reference apparatus that generates a navigation signal indicating the position of the buoy 6 based on communication results with each transponder 4 in the transceiver 8, and wirelessly transmits the generated navigation signal as a radio wave signal to the aircraft 2. Accordingly, the antenna 10 of the navigation signal transmitter 9 is attached to the buoy 6 so as to be above the water surface.

Since the buoy 6 moves on the sea surface, the position of the buoy 6 changes with time. Thus, the navigation signal may be a signal indicating the time of day and the position of the buoy 6. The position of the buoy 6 may be represented three-dimensionally in latitude, longitude, and altitude. However, the height of the sea level at which the buoy 6 floats may have a small error even if it is regarded as the geoid (i.e., the mean sea level). For this reason, the altitude may be omitted, and the position of the buoy 6 may be two-dimensionally represented by only the latitude and longitude.

The plurality of transponders 4, the transponders 4 being at different positions at the bottom of the water or in the water, are apparatuses that transmit signals for locating each transponder 4 in response to requests from the transceiver 8 mounted on the buoy 6. Signals transmitted and received between each transponder 4 and the transceiver 8 propagate through the water. Therefore, the signals to be transmitted and received signals need to be capable of propagating through water.

Examples of practical signals that may propagate through water include acoustic signals consisting of acoustic waves. However, the anchor buoy 3 may be easily moored to shallow water. Accordingly, the distance between the transceiver 8 disposed with the buoy 6 and each transponder 4 may be shortened to a distance that can be reached by an optical signal. In such a case, a signal transmitted and received between each transponder 4 and the transceiver 8 may be an optical signal. As a specific example, in the case where each transponder 4 is fixed to a shallow seafloor having a water depth of 50 m or less, a signal transmitted and received between each transponder 4 and the transceiver 8 may be an optical signal.

In addition to the navigation system 1 having such a configuration and function, the navigation signal transmitter 11 may also be fixed on the ground or on a ship. In the example illustrated in FIG. 1, a navigation signal transmitter 11 is fixed to the ground, and another navigation signal transmitter 11 is fixed to a ship 12. The navigation signal transmitter 11 installed on the ground is not limited to a building, and may be fixed to a mobile body moving on the ground, such as an automobile or a train.

The navigation signal transmitter 11 fixed on the ground or on a ship is also an apparatus that generates navigation signals indicating the position of the navigation signal transmitter 11 and the transmission time of the signals, and transmits the generated navigation signals to the aircraft 2 as radio wave signals.

Navigation signals complying with the same communication protocol are transmitted from the navigation signal transmitter 11 fixed on the ground or on the ship as well as from the navigation signal transmitter 9 of the navigation system 1 disposed on the sea. Accordingly, if the aircraft 2 is provided with a navigation system 13 for specifying the position of the aircraft 2 based on a navigation signal transmitted by the same communication protocol, the spatial position of the aircraft 2 may be specified by wirelessly receiving, in the navigation system 13 of the aircraft 2, at least three or more navigation signals transmitted from at least three navigation signal transmitters 9, 11 including the navigation signal transmitter 9 disposed on the sea. More specifically, three-dimensional positional information of the aircraft 2 represented by latitude, longitude, and altitude at a certain time may be specified.

That is, a plurality of navigation signals for specifying the position of the aircraft 2 may consist only of navigation signals transmitted from a navigation signal transmitters 9 by disposing three or more buoys 6 of the navigation system at different positions on the sea, or a plurality of navigation signals for specifying the position of the aircraft may include navigation signals transmitted from the navigation signal transmitter 11 installed on the ground or on a ship. Thus, the navigation system 13 provided to the aircraft 2 receives at least three navigation signals originating from different positions, including navigation signals originating from navigation signal transmitters 9 disposed on the sea.

The typical aircraft 2 is mounted with a navigation system 13 having a function of specifying a three-dimensional position including a latitude, a longitude, and an altitude of the aircraft 2 based on GPS signals transmitted from GPS satellites 14. The navigation signal transmitted from the navigation signal transmitter 9 disposed on the sea and the navigation signal transmitted from the navigation signal transmitter 11 installed on the ground or on the ship may also be transmitted with the same communication protocol and frequency as the GPS signals. The GPS signals includes an L1 wave having a frequency of 1575.42 MHz, an L2 wave having a frequency of 1227.60 MHz, and the like.

In this case, the terrestrial or marine navigation signal transmitters 9, 11 function in the same way as the GPS satellites 14. For this reason, as the existing PL transmitting a PL signal simulating GPS signal, the ground navigation signal transmitter 11 may transmits the PL signal as a navigation signal. In other words, the navigation signal transmitter 9 disposed on the sea may be used as a PL on the sea.

If such is the case, even when the navigation system 13 of the aircraft 2 cannot receive a GPS signal due to some cause such as a sun flare or malfunction of a GPS satellite 14, the spatial position of the aircraft 2 may be specified by the navigation system 13 of the aircraft 2 on the basis of the navigation signal transmitted from the navigation signal transmitter 9 disposed on the sea and the navigation signal transmitted from the navigation signal transmitter 11 installed on the ground or on the ship.

On the other hand, navigation signals originating from ground or sea navigation signal transmitters 9, 11 may originate from a different communication protocol and frequency from the GPS signals. In this case, the navigation system 13 of the aircraft 2 may be provided with dual functions, namely, a function of specifying the position of the aircraft 2 based on the GPS signal, and a function of specifying the position of the aircraft 2 based on navigation signals transmitted from the ground or sea navigation signal transmitters 9, 11.

If such is the case, not only when the navigation system 13 of the aircraft 2 cannot receive the GPS signal, but also when it is found that the GPS signal received by the navigation system 13 of the aircraft 2 is a deceiving signal transmitted as a jammer, it is possible to maintain navigation of the aircraft 2 by switching from the navigation of the aircraft 2 based on GPS signals to the navigation of the aircraft 2 based on navigation signals transmitted from the ground or sea navigation signal transmitters 9, 11.

As a specific example, navigation signals for LDACS-NAV having a frequency of 960 MHz or more and 1164 MHz or less may be transmitted from the navigation signal transmitters 9, 11 on the ground or on the sea. In other words, the navigational signal transmitter 9 disposed at sea may be used as a base station for LDACS-NAV at sea. In this instance, the navigation of the aircraft 2 may be performed for the aircraft 2 mounted with a navigation system 13 for LDACS-NAV. That is, the latitude, longitude, and altitude of the airplane 2 may be specified at each time by the logic of the LDACS-NAV.

The same applies to the case where the navigation system 13 is mounted on the airplane 2, the navigation system 13 being for navigating based on satellite navigation signals other than GPS signals transmitted from satellites constituting NSSs such as GNSS and RNSS.

That is, navigation signals may be transmitted from the navigation signal transmitters 9, 11 at the same frequency as the frequency of the satellite navigation signal transmitted from the satellites constituting the NSSs and also at the same frequency as the frequency of the satellite navigation signal available in the navigation system 13 provided to the aircraft 2. Thus, even when satellite navigation signals cannot be received by the navigation system 13 provided to the aircraft for some reason, navigation of the aircraft 2 may be maintained by using the navigation signals transmitted from the navigation signal transmitters 9, 11.

On the other hand, it is also possible to transmit navigation signals from the navigation signal transmitters 9, 11 at a frequency different from the frequency of the satellite navigation signals transmitted from the satellites constituting the NSS and usable by the navigation system 13 provided to the aircraft 2.

Of course, the navigation signal transmitters 9 disposed on the sea may transmit navigation signals at the frequency of the satellite navigation signals and at frequencies of two channels different from the frequency of the satellite navigation signals. In this case, the frequency channel of the navigation signal may be switched, or the navigation signal may be transmitted by two frequency channels.

Next, a detailed configuration example of the navigation system 1 will be described.

Figure 2:
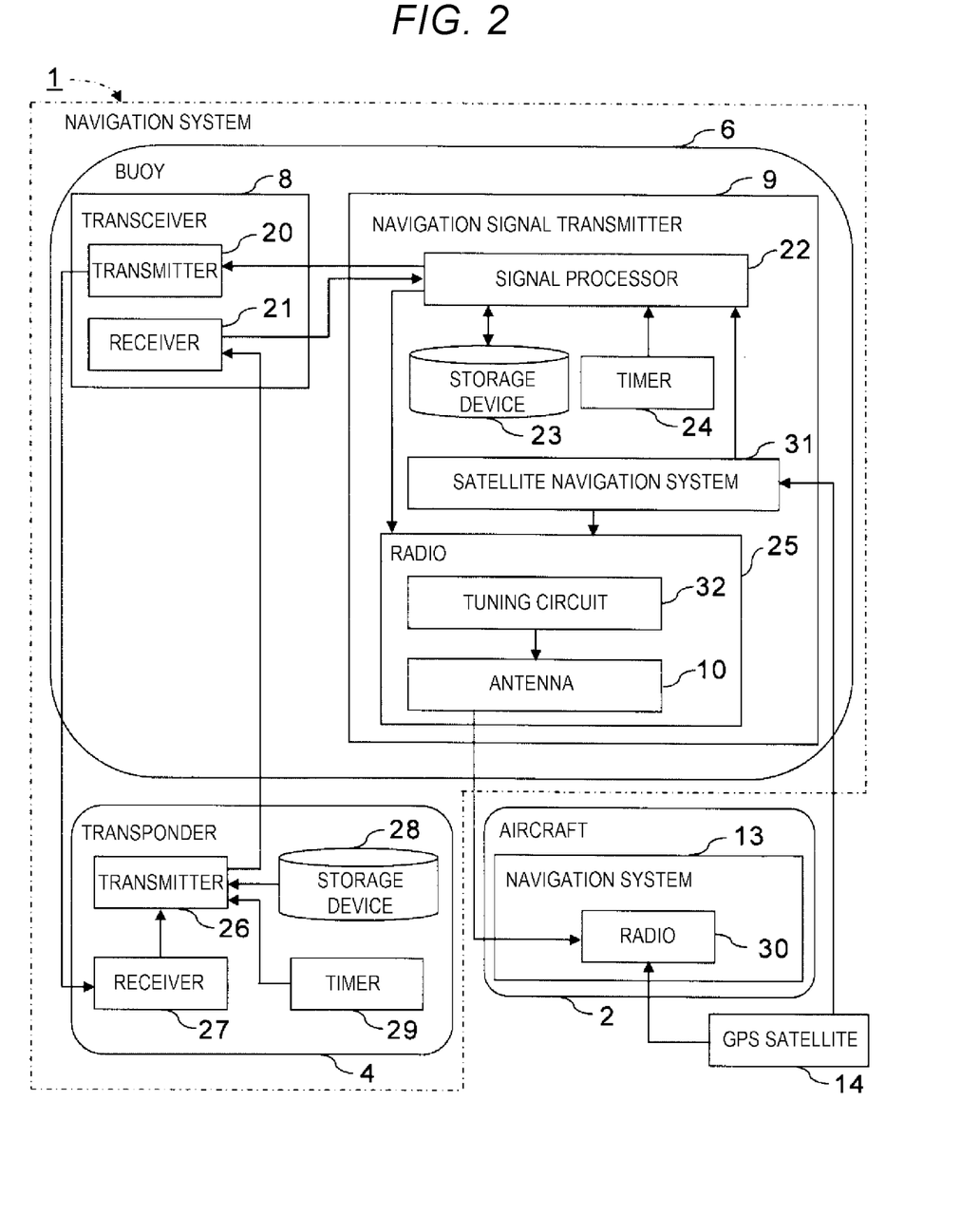
FIG. 2 is a diagram illustrating a detailed configuration example of the navigation system illustrated in FIG. 1.

FIG. 2 is a diagram illustrating a detailed configuration example of the navigation system 1 illustrated in FIG. 1.

The transceiver 8 disposed with the buoy 6 comprises a transmitter 20 and a receiver 21. The navigation signal transmitter 9 disposed with the buoy 6 may consist of a signal processor 22, a storage device 23, a timer 24, and a radio 25 provided with the antenna 10. Each transponder 4, which is fixed on the seafloor or in the sea, consists of a transmitter 26, a receiver 27, a storage device 28, and a timer 29.

The receiver 27 constituting a part of the transponder 4 is an apparatus for receiving a signal, which is transmitted from the transmitter 20 of the transceiver 8 in the buoy 6, for requesting transmission of a signal specifying the position of the transponder 4. The transmitter 26, which constitutes another part of the transponder 4, is an apparatus for transmitting a signal specifying the position of the transponder 4, which includes the transmitter 26, so that the receiver 21 of the transceiver 8 in the buoy 6 receives the signal.

The signal for specifying the position of the transponder may be position information represented by latitude, longitude, altitude, or the like, or may be identification (ID) information of the transponder 4. The storage device 28 of the transponder 4 stores position information of its own or information that specifies the position of the transponder 4, such as ID information of its own. As a result, the transmitter 26 of the transponder 4 may convert the information stored in the storage device 28 into a signal such as an acoustic signal or an optical signal and transmit the signal.

The signal for specifying the position of the transponder 4 also includes the transmission time of the signal. The transmission time of the signal is measured by the timer 29. For this purpose, the transmitter 26 of the transponder 4 refers to the timer 29, and is configured to transmit a signal of the information specifying the position of the transponder 4 with superimposing a signal of the transmission time.

The transmitter 20 constituting a part of the transceiver 8 provided to the buoy 6 is a device for transmitting a signal, such as an acoustic signal or an optical signal, to the receiver 27 in each of the plurality of transponders 4 fixed on the seafloor or in the sea, the signal being a signal requesting transmission of a signal specifying the position of the corresponding transponder 4. The receiver 21 constituting another part of the transceiver 8 is an apparatus for receiving a signal transmitted from the transmitter 26 of the transponder 4 specifying the position of the transponder 4 and outputting the signal to the signal processor 22.

The signal processor 22 provided to the buoy 6 has a function of specifying the position of the buoy 6 based on the signal received by the receiver 21 and generating a navigation signal indicating the position of the buoy 6. The radio 25 disposed with the buoy 6 is a communication apparatus that wirelessly transmits a navigation signal generated in the signal processor 22 so that the navigation signal may be received by the radio 30 provided as a component of the navigation system 13 of the aircraft 2.

From the antenna 10 of the radio 25 disposed with the navigation signal transmitter 9 in the buoy 6, the navigation signal may be intermittently transmitted at predetermined intervals to be received by the radio 30 in the aircraft 2. Therefore, the signal processor 22 is configured to generate the navigation signal intermittently at predetermined intervals.

For this reason, the transceiver 8 may be configured to intermittently transmit a signal, from the transmitter 20, requesting transmission of a signal specifying the position of each transponder 4 required to generate a navigation signal in the signal processor 22, at the transmission timing of the navigation signal. The signal processor 22 passes information to the transmitter 20 regarding the transmission timing of the transmission request for the signal to be transmitted from the transmitter 20.

Alternatively, the communication between the transceiver 8 and each transponder 4 may be one-way communication instead of two-way communication. In that case, three or more submersible signal transmitters, each comprising a transmitter 26, and a storage device 28 for specifying the position of the transmitter 26 may be fixed to different locations on the seafloor or in the water instead of the transponders 4. Further, the buoy 6 may be provided with a receiver 21 in place of the transceiver 8. That is, the transmitter 20 in the buoy 6 may be omitted.

A signal specifying the position of the submersible signal transmitter including the transmitter 26 may be transmitted from the transmitter 26 of each submersible signal transmitter at predetermined intervals. As a result, the receiver 21 disposed with the buoy 6 may receive a signal specifying the position of each submersible signal transmitter necessary for generating a navigation signal at predetermined intervals.

When a signal specifying the position of each submersible signal transmitter is transmitted by the transmitter 26 of each submersible signal transmitter and received by the receiver 21 disposed with the buoy 6 in one-way communication, it is appropriate to set the interval between the signals transmitted from the transmitter 26 of each submersible signal transmitter to be the same as or shorter than the transmission interval of the navigation signal.

Further, regardless of whether one-way communication is performed between the transmitter 26 of each submersible signal transmitter and the receiver 21 disposed with the buoy or two-way communication is performed between each transponder 4 and the transceiver 8 disposed with the buoy 6, if the transmission interval of the navigation signal is set to the smallest length which may be physically set, the navigation signal may be transmitted in a substantially continuous manner. In this case, the signals are transmitted in a substantially continuous manner from each transponder 4 or each submersible signal transmitter. Hereinafter, a case where two-way communication is performed between each transponder 4 and the transceiver 8 will be described as an example.

The navigation signal indicating the position of the buoy 6, at each time, to be generated in the signal processor 22 may be generated based on each of a plurality of positions of three or more transponders 4 fixed at mutually different predetermined positions and the time required from the transmission of the signal specifying the position of each transponder 4 from the transmitter 26 of each transponder 4 to the reception by the receiver 21 of the transceiver 8 with the buoy 6.

More specifically, the distance between each transponder 4 and the buoy 6 may be calculated based on the time required for a transmitted signal, such as an acoustic signal or an optical signal, to reach the receiver 21 with the buoy 6 from each transponder 4, and based on the speed of signal propagation, such as the speed of sound or light in water. By calculating the distance between each of the three or more transponders 4 and the buoy 6, it is possible to calculate the spatial position of the buoy 6 as the intersection point of three or more spheres whose center is the spatial position of each transponder 4 and whose radius is each distance from each transponder 4 to the buoy 6.

The spatial position of each transponder 4 may be specified on the basis of the signal transmitted by itself. If the signal originating from each transponder 4 is its own information indicating the spatial position of each transponder 4, such as the latitude, longitude and altitude, the spatial position of each transponder 4 may be directly specified on the basis of the signal originating from each transponder 4.

On the other hand, when the signal transmitted from each transponder 4 is ID information of its own, a table associating the ID information and the spatial position of each transponder 4 is stored in the storage device 23 provided to the navigation signal transmitter 9. Thus, in the signal processing apparatus 22, by referring to the table stored in the storage device 23, the spatial position of each transponder 4 may be obtained on the basis of ID information obtained by converting a signal transmitted from each transponder 4.

The time required for a signal transmitted, such as an acoustic signal or an optical signal, to reach the receiver 21 with the buoy 6 from each transponder 4 may be obtained from the time elapsed from the transmission time of the signal from each transponder 4 to the reception time of the signal in the receiver 21 in the buoy 6. The transmission time of the signal from each transponder 4 may be read from the signal transmitted from each transponder 4, as described above. The reception time of the signal in the receiver 21 in the buoy 6 side may be measured with the timer 24 disposed with the navigation signal transmitter 9.

The spatial position of the buoy 6 calculated by the signal processor 22 is the spatial position at the time at which the signal transmitted from each transponder 4 is received by the receiver 21 in the buoy 6, that is, the time measured with the timer 24 of the navigation signal transmitter 9. Therefore, the signal processor 22 may generate a navigation signal in which the time and the spatial position of the buoy 6, indicated by latitude, longitude and altitude, are mapped each other.

However, since the buoy 6 is anchored to the seafloor by the anchor 5, the position of the buoy 6 is limited to a movable range corresponding to the length of the rope 7. Therefore, when the propagation times in the water of the signals received from the plurality of transponders 4 by the receiver 21 in the buoy 6 are mapped to positions of the buoy 6 and stored, the position of the buoy 6 may be determined without performing geometric calculations such as obtaining the intersection point of spheres when the buoy 6 returns to the same position again.

When the position of the buoy 6 is calculated based on propagation time of the signals received in the water from the plurality of transponders 4 by the receiver 21 on the buoy 6 side, the signal processor 22 may be provided with a function of mapping propagation times of the respective signals with the position of the buoy 6 and storing it in the storage device 23 of the navigation signal transmitter 9. Thus, once the position of the buoy 6 is obtained, calculations for obtaining the position of the same buoy 6 again may be omitted.

Further, the navigation signal transmitter 9 may also incorporate a satellite navigation system 31. In other words, the buoy 6 may be mounted with a satellite navigation system 31 in addition to the navigation signal transmitter 9.

The satellite navigation system 31 is a navigation system that receives satellite navigation signals transmitted from at least three artificial satellites, such as the GPS satellites 14 constituting the NSS, and specifies the position of the buoy 6 based on the received satellite navigation signals. The specific configuration and functions of the satellite navigation system 31 are the same as those of the existing NSS.

The antenna of the satellite navigation system 31 for receiving the satellite navigation signals from an artificial satellite such as the GPS satellite 14 may be disposed independently of the antenna 10 for transmitting the navigation signal from the navigation signal transmitter 9 or may the same antenna depending on whether the frequency of the satellite navigation signal and the frequency of the navigation signal transmitted from the navigation signal transmitter 9 are in a common frequency band.

When the buoy 6 is provided with the satellite navigation system 31, the position of the buoy 6 may be specified based on the satellite navigation signal. Therefore, when the satellite navigation system 31 may receive a satellite navigation signal from an artificial satellite such as the GPS satellite 14, the position of the buoy 6 specified on the basis of the satellite navigation signal may be transmitted to the signal processor 22. The signal processor 22 may then be configured to generate a navigation signal that associates the position of the buoy 6 identified based on the satellite navigation signal with the time of day.

Consequently, during a period in which the satellite navigation system 31 may receive satellite navigation signals from satellites such as the GPS satellites 14, communication between the plurality of transponders 4 and the transceivers 8 may be omitted. As a result, it is possible to reduce the power consumption of each transponder 4 and transceiver 8 for generating and transmitting acoustic signals or optical signals.

On the other hand, communication may be performed between the plurality of transponders 4 and the transceivers 8 during a period in which satellite navigation signals may be received from satellites such as the GPS satellites 14 by the satellite navigation system 31. In this case, the position of the buoy 6 specified on the basis of the satellite navigation signal and the combination of propagation time of the signals through water, being received from the plurality of transponders 4 by the receiver 21 with the buoy 6 at the timing at which the satellite navigation signal is received, are mapped to each other and may be stored in the storage device 23 of the navigation signal transmitter 9 as reference information. That is, while the satellite navigation signal may be received, the position of the buoy 6 specified on the basis of the satellite navigation signal and the combination of the signals received from the plurality of transponders 4 may be mapped to each other to form a database.

Thus, in a period in which a satellite navigation signal from a satellite such as a GPS satellite 14 cannot be received by the satellite navigation system 31, the signal processor 22 may locate the buoy 6 based on the reference information if the position of the buoy 6 and the combination of propagation times of the signals received from the plurality of transponders 4 at the receiver 21 in the buoy 6 are mapped to each other and stored in the storage device 23 as reference information. In this case, even when the satellite navigation signal cannot be received, the position of the buoy 6 may be specified with an accuracy equivalent to the accuracy of specifying the position of the buoy 6 based on the satellite navigation signal.

When the buoy 6 is provided with the satellite navigation system 31, whether the satellite navigation signal is received by the satellite navigation system 31 may be important information for the user of the aircraft 2. Therefore, the signal processor 22 may generate a navigation signal with information indicating whether the satellite navigation signal has been received in addition to the position of the buoy 6. In this case, the user of the aircraft 2 who boards the manned aircraft or a user on the aircraft 2 who remotely controls the unmanned aircraft may grasp the information whether the NSS is available based on the navigation signal transmitted from the navigational signal transmitter 9 on the sea.

Further, the frequency of the navigation signal transmitted from the navigational signal transmitter 9 on the sea may be switched according to whether a satellite navigation signal has been received by the satellite navigation system 31. In this case, the radio 25 of the navigation signal transmitter 9 may be provided with a tuning circuit 32 for automatically tuning the frequency of the navigation signal in accordance with whether a satellite navigation signal has been received by the satellite navigation system 31.

As a practical example, if a satellite navigation signal is not received by the satellite navigation system 31, a navigation signal indicating the position of the buoy 6 at least at the same frequency as the frequency of the satellite navigation signal may be transmitted from the radio 25. That is, a navigation signal may be transmitted only through a one channel frequency having the same frequency as the frequency of the satellite navigation signal, or through the two channels having the same frequency as the frequency of the satellite navigation signal and a frequency which is different from the frequency of the satellite navigation signal.

As a result, even if the NSS such as the GPS cannot be used, the navigation system 13 provided to the aircraft 2 side may be used continuously by using the navigation signal transmitted from the navigation signal transmitter 9 on the sea.

On the other hand, if a satellite navigation signal is received by the satellite navigation system 31, a navigation signal indicating the position of the buoy 6 at least at a different frequency from the frequency of the satellite navigation signal and available in the navigation system 13 provided to the aircraft 2 may be transmitted from the radio 25. That is, a navigation signal may be transmitted only through a one channel frequency having a different frequency from the frequency of the satellite navigation signal, or through two channels having the same frequency as the frequency of the satellite navigation signal and a frequency which is different from the frequency of the satellite navigation signal.

Thus, when it is found that a deceiving signal disguised as a satellite navigation signal such as a GPS signal is transmitted, the frequency channel is quickly switched to a frequency channel different from the frequency channel of the satellite navigation signal, and the navigation system 13 provided to the aircraft 2 may be continuously used.

Alternatively, when a satellite navigation signal is received by the satellite navigation system 31, the satellite navigation signal is highly likely to be received also by the navigation system 13 provided to the aircraft 2. Therefore, so long as the satellite navigation signal is received by the satellite navigation system 31, only the accumulation of the reference information mapping the combination of the position of the buoy 6 and the signals received from the transponders 4 may be performed, and the transmission of the navigation signal from the navigation signal transmitter 9 disposed on the sea may not be performed. In other words, the generation and transmission of the navigation signal from the navigation signal transmitter 9 disposed on the sea may be automatically started by using fact that the satellite navigation system 31 is not able to receive the satellite navigation signal as a trigger. In this case, the power consumption in the navigation system 1 may be further reduced.

The information that may be important to the user of the aircraft 2 includes information indicating soundness of the buoy 6, such as whether an apparatus of the navigation system 1 mounted on the buoy 6 has failed, the remaining amount of the battery, in addition to the matter of whether the satellite navigation signal such as a GPS signal may be received by the satellite navigation system 31. Therefore, the signal processor 22 may generate a navigation signal indicating the soundness of the buoy 6 in addition to the position of the buoy 6. In this case, it is possible to notify the user of the aircraft 2 of the necessity of repairing or replacing the equipment mounted on the buoy 6.

In the navigation system 1 having the above-described configuration and function, a component for processing a signal such as an optical signal, an acoustic signal, or an electrical signal may be configured by a circuit such as an optical signal circuit, an acoustic signal circuit, or an electrical circuit. Further, the component for processing digital information may be constituted by an electronic circuit in which a computer program is read by an arithmetic circuit.

(Navigation Method using the Navigation System)

Next, a navigation method using the navigation system 1 will be described.

Figure 3:
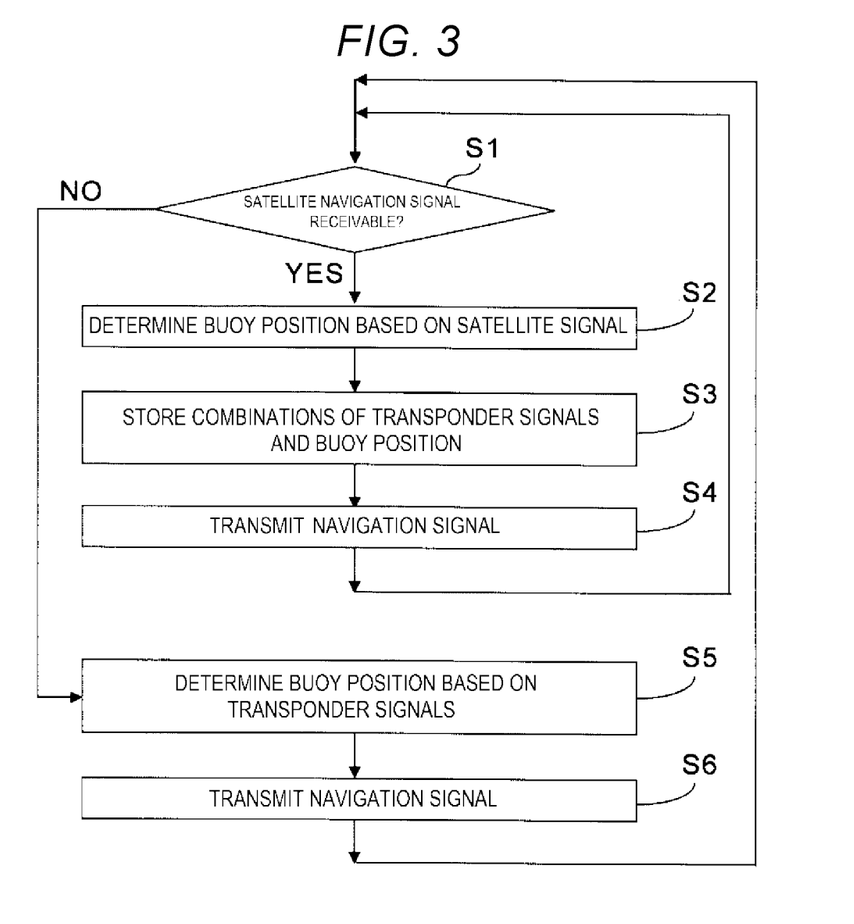
FIG. 3 is a flowchart illustrating a process for performing navigation of an aircraft with the navigation system illustrated in FIGS. 1 and 2.

FIG. 3 is a flowchart illustrating a process for navigating the aircraft 2 with the navigation system 1 illustrated in FIGS. 1 and 2.

First, in step S1, it is determined whether a satellite navigation signal such as a GPS signal may be received by the satellite navigation system 31 incorporated in the navigation system 1. If it is determined that the satellite navigation signal is receivable, the satellite navigation signal is received by the satellite navigation system 31 in step S2, and the position of the buoy 6 is specified based on the received satellite navigation signal. The position of the specified buoy 6 is transmitted to the signal processor 22 of the navigation signal transmitter 9.

At the same time, a signal requesting a signal specifying the position of each transponder 4 is transmitted from the transmitter 20 of the transceiver 8 to each transponder 4 as an acoustic signal, an optical signal, or the like. The transmitted request signal is received by the receiver 27 of each transponder 4. When the request signal is received at the receiver 27 of each transponder 4, the receiver 27 notifies the transmitter 26 of the reception of the request signal.

Then, the transmitter 26 of each transponder 4 refers to the storage device 28 in response to receiving the request signal, and converts the information specifying the position of each transponder 4 into a signal together with the time information acquired from the timer 29. The signal thus generated is transmitted from the transmitter 26 of each transponder 4 into the water. The signal transmitted from the transmitter 26 of each transponder 4 is received by the receiver 21 of the transceiver 8 and provided to the signal processor 22.

Next, in step S3, the combination of times taken for the signal from the transmitter 26 of each transponder 4 to reach the receiver 21 of the transceiver 8 is mapped to the position of the buoy 6 by the signal processor 22. The combinations of arrival time of the signal from each transponder 4 to the transceiver 8 and the position of the buoy 6 are stored in the storage device 23 as reference information.

Next, in step S4, the signal processor 22 generates a navigation signal by mapping the position of the buoy 6 specified based on the satellite navigation signal with the reception times of the satellite navigation signals acquired from the timer 24. The generated navigation signal is transmitted as a radio wave signal from the antenna 10 of the radio 25.

The navigation signal transmitted from the antenna 10 of the radio 25 disposed with the navigation signal transmitter 9 is received by the radio 30 of the navigation system 13 provided to the aircraft 2 together with the navigation signal transmitted from at least one of the navigation signal transmitter 9 disposed at another position on the sea or the navigation signal transmitter 11 disposed at a position other than the sea. That is, a plurality of at least three navigation signals including navigation signals originating from the navigation system 1 and originating from different positions are received by the radio 30 provided to the aircraft 2.

The navigation system 13 on the aircraft 2 may then specify the spatial position of the aircraft 2 based on the plurality of navigation signals received by the radio 30 on the aircraft 2. This allows the aircraft 2 to continue cruising with reference to the spatial position thereof. The determination of the spatial position of the aircraft 2 based on the satellite navigation signal may be repeated until it is determined in step S1 that the satellite navigation signal is not receivable.

The order of storing the reference information in step S3 and the generation and transmission of the navigation signal in step S4 may be done in any order. When a satellite navigation signal is received by the satellite navigation system 31, the satellite navigation signal is highly likely to be received also by the navigation system 13 provided to the aircraft 2. Therefore, the transmission of the navigation signal from the navigation signal transmitter 9 disposed on the sea in step S4 may be omitted.

If it is determined in step S1 that the satellite navigation signal is not receivable, that is, if it is determined as NO, in step S5, the process is switched to determining the position of the buoy 6 based on the signals from the plurality of transponders 4 fixed on the seafloor or in the sea. That is, the signal transmitted from the transmitter 26 of each transponder 4 is subsequently received by the receiver 21 of the transceiver 8 and supplied to the signal processor 22.

The signal processor 22 then calculates the propagation time of the signal from each transponder 4 to the transceiver 8 as the difference between the measurement time in the timer 24 and the transmission time of the signal superimposed on each signal. It is then determined whether the combination of propagation times of signals from each transponder 4 to the transceiver 8 is stored in the storage device 23 as reference information mapped to the position of the buoy 6.

When the reference information is stored in the storage device 23, the signal processor 22 may acquire the position of the buoy 6 corresponding to the combination of propagation times of signals from each transponder 4 to the transceiver 8 based on the reference information. On the other hand, when the reference information is not stored in the storage device 23, the distance between each transponder 4 and the buoy 6 is calculated based on the combination of the propagation time of the signal from each transponder 4 to the transceiver 8 and the propagation speed of the signal. The spatial position of the buoy 6 may then be geometrically calculated based on the distance between each transponder 4 and the buoy 6.

Next, in step S6, the signal processor 22 generates a navigation signal by mapping the position of the buoy 6 specified based on the signals received from the transponder 4 with the reception times of the signals acquired from the timer 24. The generated navigation signal is transmitted as a radio wave signal from the antenna 10 of the radio 25. As a result, the navigation system 13 on the aircraft 2 may continuously specify the spatial position of the aircraft 2. That is, even when a satellite navigation signal such as a GPS signal cannot be received, the spatial position of the aircraft 2 may be specified. The determination of the spatial position of the aircraft 2 on the basis of signals received from the transponders 4 is repeated until it is determined in step S1 that the satellite navigation signal is receivable.

(Effect)

In the navigation system 1 and the navigation method as described above, the navigation signal transmitter 9 for transmitting the navigation signal to a moving object such as the aircraft 2 is mounted on the anchor buoy 3 floating on the water, and the position of the anchor buoy 3 floating within the allowable range is specified on the basis of the signal received from three or more transponders 4 fixed on the bottom or in the water.

As a result, with the navigation system 1 and the navigation method, the apparatus for transmitting navigation signals, which was typically installed on the ground in the past, such as with LDACS-NAV or PL, may be installed on the sea or on a body of water such as a large river. As a result, the range of use of navigation systems that do not use artificial satellites may be expanded. Further, by combining the navigation signals with navigation signals transmitted from the ground, it is possible to improve the accuracy of calculating the spatial position of a mobile body near water.

In particular, if the navigation signal is transmitted from the sea at the same frequency as the frequency of the satellite navigation signal, the position of a mobile body such as the aircraft 2 may be specified even if satellite navigation signals cannot be received due to a sun flare, an artificial satellite failure, or the like. On the other hand, if navigation signals transmitted from the sea at a frequency different from the frequency of satellite navigation signals, even if a deceiving signal of the satellite navigation signal is transmitted, the navigation of a mobile body such as the aircraft 2 may be continued by immediately utilizing navigation signals in another frequency band.

Second Example

Figure 4:
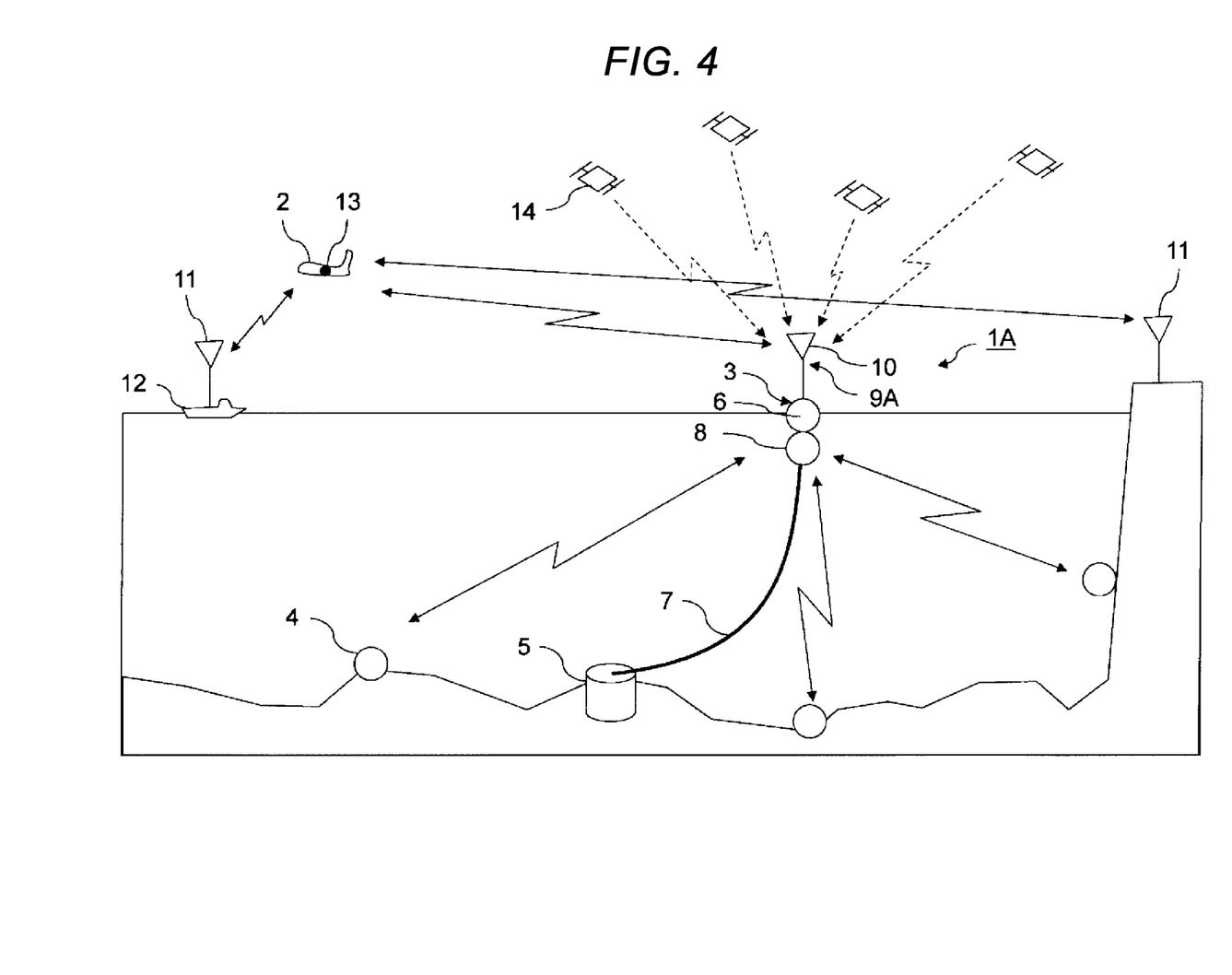
FIG. 4 is an overall configuration diagram of a navigation system according to a second example of the present invention.

FIG. 4 is an overall configuration diagram of a navigation system according to a second example of the present invention.

The navigation system 1A according to the second example illustrated in FIG. 4 differs from the navigation system 1 according to the first example in that two-way communication may be performed between a navigation signal transmitter 9A disposed on the sea and a mobile body such as the aircraft 2. Other configurations and operations of the navigation system 1A in the second example are not substantially different from those of the navigation system 1 in the first example, and therefore the same or corresponding configurations are denoted by the same reference numerals and descriptions thereof are omitted.

That is, whereas in the first example, a case where one-way communication is performed between the navigation signal transmitter 9 disposed on the sea and the navigation system 13 disposed with a mobile body such as the aircraft 2 was described as an example, two-way communication may be performed between the navigation signal transmitter 9A disposed on the sea and the navigation system 13 disposed with a mobile body such as the aircraft 2.

In this case, the radio 25 of the navigation signal transmitter 9A is provided with a function of performing two-way communication with the navigation system 13 disposed with a mobile body such as the aircraft 2. When the radio 25 of the navigation signal transmitter 9A receives a transmission request of a navigation signal transmitted from the radio 30 of the navigation system 13 disposed with the aircraft 2, the signal processor 22 is notified of the transmission request of the navigation signal.

On the other hand, the signal processor 22 is configured to generate a navigation signal in response to a request for transmit of a navigation signal transmitted from the radio 30 of the navigation system 13 disposed with the aircraft 2. This makes it possible to transmit a navigation signal from the radio 25 of the navigation signal transmitter 9A when a request for transmitting a navigation signal is received from the navigation system 13 disposed with a mobile body such as the aircraft 2.

For this reason, for instance, as a communication apparatus for transmitting and receiving signals similar to DME, which is typical existing communication equipment for performing two-way communication, a navigation signal transmitter 9A disposed on the sea may be used. That is, the range of use of a navigation system using the DME may be extended to the sea or the like.

It should be noted that even when two-way communication may be performed between the navigation signal transmitter 9A disposed on the sea and the navigation system 13 provided to a mobile body such as the aircraft 2, a transmission mode in which the navigation signal is continuously transmitted from the navigation signal transmitter 9A disposed on the sea and a transmission mode in which the navigation signal is transmitted in response to a request from the navigation system 13 provided to the mobile body such as the aircraft 2 may be used by switching between the two transmission modes.

As a specific example, when the satellite navigation signal is not received by the satellite navigation system 31, the navigation signal may be transmitted in the transmission mode in which the navigation signal is continuously transmitted from the navigation signal transmitter 9A. That is, the signal processor 22 may intermittently generate a navigation signal at predetermined intervals and may transmit the generated navigation signal from the radio 25.

On the other hand, when the satellite navigation signal is received by the satellite navigation system 31, the navigation signal may be transmitted in the transmission mode in which the navigation signal is transmitted in response to a request from the navigation system 13 disposed with a mobile body such as the aircraft 2. That is, when a request for transmission of a navigation signal transmitted from the radio 30 of the navigation system 13 disposed with a mobile body such as the aircraft 2 is received by the radio 25 of the navigation signal transmitter 9A, the signal processor 22 may generate a navigation signal in response to the request for transmission of the navigation signal. In response to the request for transmission of the navigation signal, the navigation signal may be transmitted from the radio 25.

As another specific example, in case where a satellite navigation signal is received by a satellite navigation system 31, when a radio 25 of the navigation signal transmitter 9A receives a request for transmission of a navigation signal from the navigation system 13 disposed with a mobile body such as an aircraft 2, the satellite navigation signal may be a deceiving signal, or the navigation system 13 disposed with a mobile body such as the aircraft 2 may not be using a satellite navigation signal.

Therefore, although the satellite navigation signal is received by the satellite navigation apparatus 31, when the radio 25 of the navigation signal transmitting apparatus 9A receives a request for transmission of the navigation signal from the navigation system 13 disposed with a mobile body such as the aircraft 2, the frequency may be automatically adjusted by the tuning circuit 32 so that the navigation signal is transmitted from the navigation signal transmitter 9A at a frequency different from the frequency of the satellite navigation signal.

According to the second example described above, generating and transmitting unnecessary navigation signals from the navigation signal transmitter 9A may not frequently occur. In this way, power consumption of the navigation signal transmitter 9A may be further reduced. Further, when a request is made from the navigation system 13 disposed with a mobile body such as the aircraft 2, the frequency of the navigation signal may be switched from outside of the navigation system 1A.

Other Examples

While specific examples have been described above, the described examples are by way of example only and are not intended to limit the scope of the present invention. The novel methods and apparatuses described herein may be embodied in a variety of other manners. Various omissions, substitutions, and changes may be made in the manner of the methods and apparatuses described herein without departing from the spirit of the present invention. The appended claims and their equivalents include such various forms and modifications falling within the scope and spirit of the present invention.

For instance, in the example described above, the case where the navigation signal transmitted from the navigation signal transmitter 9 disposed at sea is used in a mobile body such as the aircraft 2 as a signal instead of the satellite navigation signal transmitted from the GPS satellite 14 or the like has been described, but the calculation accuracy of the spatial position of the mobile body may be improved by using the navigation signal in combination with a satellite navigation signal transmitted from the GPS satellite 14 or the like.

The invention claimed is:

1. A navigation system comprising:
a buoy on a water surface movably anchored to a bottom;
a plurality of transmitters fixed to the bottom or at different positions in the water for transmitting signals to specify the positions, the plurality of transmitters including at least three transmitters;
a receiver, being disposed with the buoy, configured to receive signals transmitted by the plurality of transmitters;
a satellite navigation system, being disposed with the buoy, configured to receive satellite navigation signals originating from satellites comprising a navigation satellite system, and configured to specify the position of the buoy based on the received satellite navigation signals;
a storage device, being disposed with a buoy;
a signal processor, being disposed with the buoy, configured to;
determine whether a satellite navigation signals are received at the satellite navigation system,
when the satellite navigation signals are not received, determine the position of the buoy based on the received signals transmitted by the plurality of transmitters;
when the satellite navigation signals are received, determine the position of the buoy based on the satellite navigation signals, and store combinations of the received signals transmitted by the plurality of transmitters and the position of the buoy in the storage device; and
generate a navigation signal indicating the position of the buoy, and a radio, being disposed with the buoy, configured to transmit the navigation signal generated in the signal processor wirelessly, the navigation signal being receivable by a radio in a mobile body.

2. The navigation system according to claim 1, wherein the storage device is configured to associate a position of the buoy specified on the basis of the satellite navigation signals with the signals received by the receiver from the transmitters at a timing when the satellite navigation signals are received.

3. The navigation system according to claim 1, wherein each of the plurality of transmitters is configured as a part of a transponder transmitting the signal for specifying the positions of the transmitter, the receiver is configured as part of a transceiver, and the transponder is configured to transmit the signal in response to a request from the transceiver.

4. The navigation system according to claim 1, wherein each of the plurality of transmitters is configured to intermittently transmit the signal at predetermined intervals.

5. The navigation system according to claim 1, wherein the signal processor is configured to generate the navigation signal, in response to a request for transmission of the navigation signal, transmitted from the radio disposed with the mobile body.

6. The navigation system according to claim 1, wherein the signal processor is configured to generate the navigation signal intermittently at predetermined intervals.

7. The navigation system according to claim 1, wherein the plurality of transmitters are configured to transmit acoustic or optical signals as signals.

8. The navigation system according to claim 1, wherein the radio is configured to transmit the navigation signal indicating the position of the buoy at a frequency of a navigation signal available in a navigation system provided to the mobile body, the frequency of the navigation signal being different from a frequency of a satellite navigation signal available in the navigation system provided to the mobile body, of the satellite navigation signal being transmitted from a satellite constituting the navigation satellite system.

9. The navigation system according to claim 1, wherein the radio is configured to transmit the navigation signal indicating the position of the buoy at a frequency of 950 MHz to 1164 MHz.

10. The navigation system according to claim 1, wherein the radio is configured to transmit the navigation signal indicating the position of the buoy at the same frequency as a frequency of a satellite navigation signal transmitted from a satellite constituting a navigation satellite system provided to the mobile body.

11. The navigation system according to claim 1, wherein the signal processor is configured to generate the navigation signal indicating the position of the buoy and soundness of the buoy.

12. The navigation system according to claim 2, wherein the navigation signal further carries information indicating whether the satellite navigation signals were received.

13. The navigation system according to claim 2, wherein the radio is configured to transmit the navigation signal indicating the position of the buoy at least at the same frequency as the frequency of the satellite navigation signal when the satellite navigation signals are not received, while when the satellite navigation signals are received, the radio is configured to transmit the navigation signal indicating the position of the buoy at least at a frequency different from the frequency of the satellite navigation signal.

14. The navigation system according to claim 2, wherein the signal processor is configured to generate the navigation signal intermittently at predetermined intervals when the satellite navigation signals are not received, and in which the signal processor is configured to generate the navigation signal in response to a request for transmission of the navigation signal transmitted from the radio provided to the mobile body when the satellite navigation signals are received.

15. The navigation system according to claim 1, wherein:
the radio in the mobile body is configured to receive a plurality of navigation signals originated from different positions, the plurality of navigation signals being at least three navigation signals including the navigation signals transmitted by the navigation satellite system, and
the mobile body is configured to determine its position based on the plurality of navigation signals received by the radio in the mobile body.

16. The navigation system according to claim 15, wherein the plurality of navigation signals further comprises a navigation signal originating from a radio installed on a ground or on a ship.

* * * * *